United States Patent
Cook et al.

(10) Patent No.: US 9,930,309 B2
(45) Date of Patent: Mar. 27, 2018

(54) SYSTEM, METHOD AND APPARATUS FOR INBAND VARIABLE MEDIA MATURITY FILTERING

(75) Inventors: Andrew Cook, Lenexa, KS (US); Jade Kerr, Kiansas City, KS (US); Mohit Mathur, Olathe, KS (US); Michael Morrissey, Overland Park, KS (US); Clinton Smoyer, Raymore, MO (US); Lee Curbow, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 806 days.

(21) Appl. No.: 12/402,297

(22) Filed: Mar. 11, 2009

(65) Prior Publication Data

US 2010/0232758 A1 Sep. 16, 2010

(51) Int. Cl.
| | |
|---|---|
| *H04N 9/80* | (2006.01) |
| *H04N 9/804* | (2006.01) |
| *G11B 27/10* | (2006.01) |
| *H04N 21/41* | (2011.01) |
| *H04N 21/431* | (2011.01) |
| *H04N 21/4402* | (2011.01) |
| *H04N 5/92* | (2006.01) |

(52) U.S. Cl.
CPC ......... *H04N 9/8042* (2013.01); *G11B 27/105* (2013.01); *H04N 21/4104* (2013.01); *H04N 21/4318* (2013.01); *H04N 21/44029* (2013.01); *G11B 2220/2562* (2013.01)

(58) Field of Classification Search
CPC ........... H04N 21/4318; H04N 21/4104; H04N 21/44029; H04N 9/8042; G11B 2220/2562; G11B 27/105

USPC .................................. 386/95; 725/28, 44
See application file for complete search history.

(56) References Cited

U.S. PATENT DOCUMENTS

| | | | | |
|---|---|---|---|---|
| 6,937,730 | B1 * | 8/2005 | Buxton ................. | H04N 7/163 348/E7.061 |
| 2001/0001159 | A1 * | 5/2001 | Ford ...................... | H04N 7/088 725/25 |
| 2004/0003398 | A1 * | 1/2004 | Donian .................. | G06F 21/10 725/34 |
| 2005/0066357 | A1 * | 3/2005 | Ryal ................. | H04N 21/23424 725/35 |
| 2005/0166224 | A1 * | 7/2005 | Ficco ................... | H04H 20/106 725/35 |

(Continued)

OTHER PUBLICATIONS

Clearplay website, http://www.clearplay.com; reviewed Mar. 29, 2013.

*Primary Examiner* — Gary Gracia
(74) *Attorney, Agent, or Firm* — Swanson & Bratschun, L.L.C.

(57) ABSTRACT

An embodiment of a method for filtering a digital media file includes receiving a selection of a first maturity level, and receiving a media content rating table including at least one media rating entry. Each media rating entry includes a location indicator indicating a predetermined portion of the digital media file and a maturity rating indicator corresponding to a maturity rating of the predetermined portion. The method further includes receiving the digital media file, and modifying at least one predetermined portion of the digital media file if the indicated maturity rating of the at least one predetermined portion is greater than the selected first maturity level to produce a first modified digital media file.

14 Claims, 4 Drawing Sheets

(56) References Cited

U.S. PATENT DOCUMENTS

| | | | |
|---|---|---|---|
| 2006/0110136 A1* | 5/2006 | Abecassis | G11B 7/14 386/261 |
| 2006/0130118 A1* | 6/2006 | Damm | H04L 63/0245 725/135 |
| 2006/0130119 A1* | 6/2006 | Candelore | H04N 7/163 725/135 |
| 2006/0161635 A1* | 7/2006 | Lamkin | G06F 17/30041 709/217 |
| 2006/0177198 A1* | 8/2006 | Jarman | H04N 5/85 386/261 |
| 2007/0127843 A1* | 6/2007 | Shiraishi | G11B 27/034 382/276 |
| 2007/0168853 A1* | 7/2007 | Jarman | G11B 27/105 715/205 |
| 2007/0180462 A1* | 8/2007 | Shin | H04N 5/4401 725/28 |
| 2007/0186235 A1* | 8/2007 | Jarman | H04N 7/163 725/28 |
| 2007/0196074 A1* | 8/2007 | Jennings et al. | 386/46 |
| 2007/0204288 A1* | 8/2007 | Candelore | H04N 5/4401 725/28 |
| 2007/0208751 A1* | 9/2007 | Cowan | G06Q 10/10 |
| 2007/0212025 A1* | 9/2007 | Barton | G11B 27/105 386/261 |
| 2007/0233701 A1* | 10/2007 | Sherwood | G06F 17/30029 |
| 2007/0256093 A1* | 11/2007 | Hiler | G06F 17/3089 725/28 |
| 2007/0260603 A1* | 11/2007 | Tuscano | G06F 17/30867 |
| 2008/0040380 A1* | 2/2008 | Miyaki | G11B 27/036 |
| 2008/0201369 A1* | 8/2008 | Cordoba | H04N 5/44513 |
| 2008/0222673 A1* | 9/2008 | Durden | H04N 7/163 725/25 |
| 2008/0235731 A1* | 9/2008 | Bryant et al. | 725/44 |
| 2008/0313666 A1* | 12/2008 | Evenson | H04N 5/765 725/28 |
| 2009/0132721 A1* | 5/2009 | Soroushian | G06F 17/30056 709/231 |
| 2009/0133089 A1* | 5/2009 | Ku | H04N 21/4532 725/131 |
| 2009/0138905 A1* | 5/2009 | Blanchard | H04N 7/162 725/25 |
| 2009/0150444 A1* | 6/2009 | Cohen | G06Q 20/1235 |
| 2009/0151008 A1* | 6/2009 | Cohen et al. | 726/30 |
| 2009/0158318 A1* | 6/2009 | Levy | G06F 21/125 725/32 |
| 2009/0165140 A1* | 6/2009 | Robinson | G06F 21/10 726/26 |
| 2009/0178081 A1* | 7/2009 | Goldenberg et al. | 725/46 |
| 2009/0180025 A1* | 7/2009 | Dawson | H04N 5/44504 348/578 |
| 2009/0204475 A1* | 8/2009 | Cohen et al. | 705/10 |
| 2009/0210946 A1* | 8/2009 | Cohen et al. | 726/27 |
| 2009/0235364 A1* | 9/2009 | Cohen | G06Q 10/101 726/28 |
| 2009/0249244 A1* | 10/2009 | Robinson | G06F 3/0481 715/781 |
| 2010/0077425 A1* | 3/2010 | Shin | H04N 5/4401 725/28 |
| 2010/0153520 A1* | 6/2010 | Daun | G11B 27/034 709/218 |
| 2011/0030009 A1* | 2/2011 | Mountain | H04N 5/44543 725/44 |
| 2013/0174194 A1* | 7/2013 | Mooneyham | H04N 21/4348 725/28 |

* cited by examiner

SYSTEM, METHOD AND APPARATUS FOR INBAND VARIABLE MEDIA MATURITY FILTERING

BACKGROUND

Media content rating systems provide viewers and/or listeners of a media program with an indication of the suitability of the media program for children and/or adults. A media content rating is determined using factors such as the level and/or amount of violence, adult language, sexual content, and nudity that is present in a particular media program. An example of a content rating system for television programs is the TV Parental Guidelines systems which includes ratings of TV-Y (directed at young children), TV-Y7 or TV-Y7-FV (directed to children 7 and older), TV-G (directed to general audiences), TV-14 (recommended for those aged 14 or older), and TV-MA (intended for mature audiences). An example of a content rating system for movies is the Motion Picture Association of America film rating system which includes ratings of G (for general audiences), PG, (parental guidance is suggested), PG-13 (parents are strongly cautioned), R (restricted—those under 17 years of age require accompaniment of a parent or adult aged 21 or older), and NC-17 (no one aged 17 and under is admitted). These media content ratings assist a parent or guardian in determining whether he or she wishes to allow a child to view and/or listen to a particular media program.

SUMMARY

An embodiment of a method for filtering a digital media file includes receiving a selection of a first maturity level, and receiving a media content rating table including at least one media rating entry. Each media rating entry includes a location indicator indicating a predetermined portion of the digital media file and a maturity rating indicator corresponding to a maturity rating of the predetermined portion. The method further includes receiving the digital media file, and modifying at least one predetermined portion of the digital media file if the indicated maturity rating of the at least one predetermined portion is greater than the selected first maturity level to produce a first modified digital media file.

An embodiment of a media maturity filter device includes a memory, and at least one processor. The at least one processor is configured to retrieve computer-readable instructions from the memory and execute the computer-readable instructions so as to receive a selection of a first maturity level, and receive a media content rating table including at least one media rating entry. Each media rating entry includes a location indicator indicating a predetermined portion of the digital media file and a maturity rating indicator corresponding to a maturity rating of the predetermined portion. The at least one processor is further configured to receive the digital media file, and modify at least one predetermined portion of the digital media file if the indicated maturity rating of the at least one predetermined portion is greater than the selected first maturity level to produce a first modified digital media file.

An embodiment of a computer usable program product in a computer-readable medium stores computer executable instructions that, when executed, cause at least one processor to receive a selection of a first maturity level, and receive a media content rating table including at least one media rating entry. Each media rating entry includes a location indicator indicating a predetermined portion of the digital media file and a maturity rating indicator corresponding to a maturity rating of the predetermined portion. The computer executable instructions further cause the at least one processor to receive the digital media file, and modify at least one predetermined portion of the digital media file if the indicated maturity rating of the at least one predetermined portion is greater than the selected first maturity level to produce a first modified digital media file.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Often, a network broadcaster will control the maturity level of a media broadcast by either bleeping or replacing objectionable audio in the media broadcast to make it acceptable to a wide range of audiences. It may be desirable for a user to have the ability to control a maturity level of media content so as to restrict the media content to be appropriate when viewed or listened to by a particular audience, such as an audience of a particular age group. One or more embodiments of the invention provide for an inband variable media maturity filter device that is configured to allow an end-user to select a maturity level for a digital media file or a digital media stream on a per-playback or per-user basis. Examples of a digital media file in various embodiments include a digital audio file, digital video file, or digital audio/video file. In one or more embodiments, a predefined media content rating table and a digital media file is transmitted to the inband variable media maturity filter device.

In one or more embodiments, the predefined media content rating table contains maturity rating information associated with portions of the digital media file that allows the inband variable media maturity filter device to modify one or more of the portions of audio in accordance with a maturity level selected by a user. For example, a parent may wish to choose a maturity level that will provide PG-13 rated audio when viewing a movie with their teenagers, but choose an R rated maturity level for watching the same movie at a later time alone. In one or more embodiments, the media content rating table is created by a provider or producer of the digital media file viewing or listening to the digital media file, rating potentially objectionable portions of the digital media file, and entering maturity ratings information associated with the potentially objectionable portions in the media content rating table. In one or more embodiments, the inband variable media maturity filter device may be further configured to receive an alternate media table containing one or more alternate media blocks that may be used to replace one or more of the potentially objectionable portions of the digital media file with content suitable for the selected maturity level.

Figure 1:
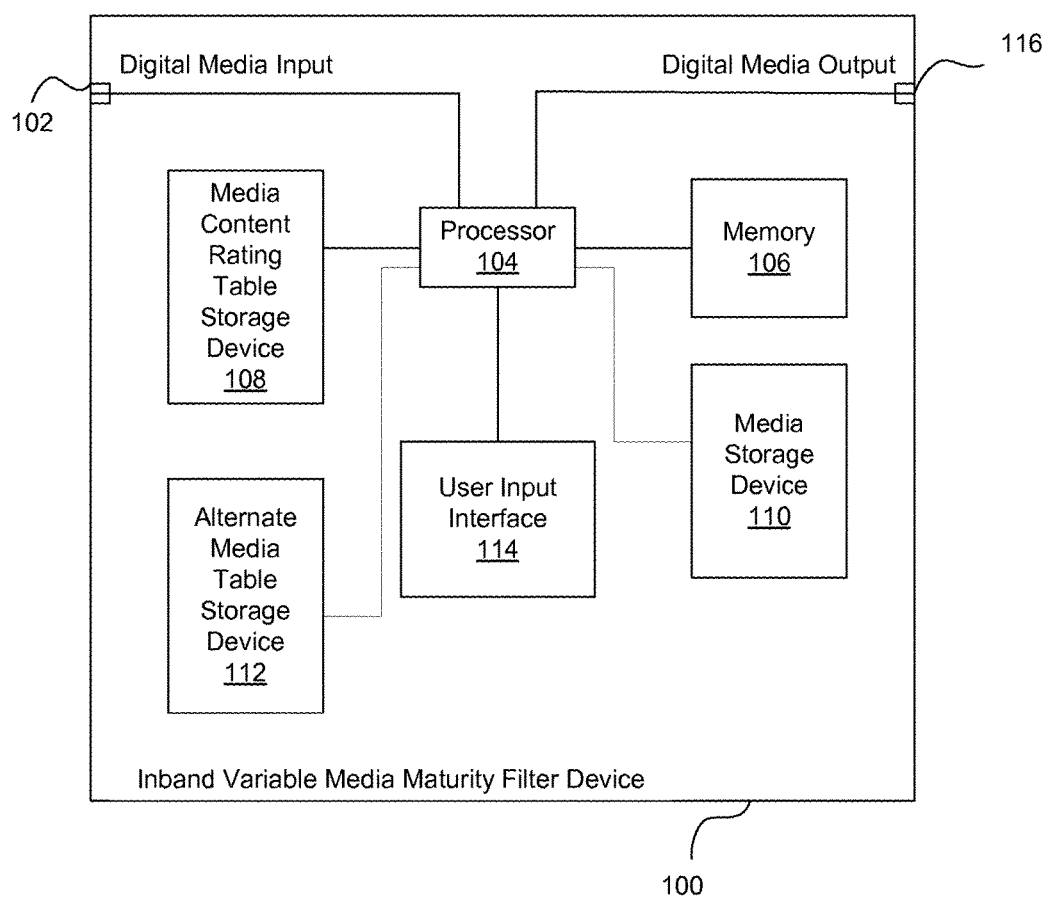
FIG. 1 is an embodiment of an inband variable media maturity filter device.

FIG. 1 is an embodiment of an inband variable media maturity filter device 100. The inband variable media maturity filter device 100 includes a digital media input 102 in communication with a processor 104. The processor 104 is in further communication with a memory 106, a media content rating table storage device 108 and a media storage device 110, an alternate media table storage device 112, a user input interface 114, and a digital media output 116. In at least one embodiment, the inband variable media maturity filter device 100 is a set-top box located at a customer premise location. In various embodiments, the processor 104 is configured to retrieve computer readable instructions from the memory 106 and execute the computer readable instructions to perform various functions of the processor 104 described herein.

In one or more embodiments, the digital media input 102 is configured to receive a digital medial file and a media content rating table associated with the digital media file from a digital media source. In at least one embodiment, the digital media source may include a television service provider. The processor 104 is configured to store the digital media file in the media storage device 110, and store the media content rating table in the media content rating table storage device 108. In at least one embodiment, the digital media file includes one or more media programs such as one or more movies, television programs, or audio programs. In one or more embodiments, the digital media file may include one or more of a digital audio file, a digital video file, or a digital multi-media file including both audio and video content. In one or more embodiments, the digital media file includes one or more media blocks where each media block contains a portion of the media content of the digital media file. In a particular embodiments, the digital media file is a Motion Picture Experts Group (MPEG) file and the one or more media blocks are MPEG encoded data blocks.

The media content rating table includes one or more media rating entries, each corresponding to the digital media file. In various embodiments, each media rating entry of the media content rating table includes a location indicator indicating a predetermined portion of the digital media file and a maturity rating indicator corresponding to a maturity rating of that predetermined portion. In a particular embodiment, the location indicator is a time indicator corresponding to elapsed time of a portion of the digital media file. The maturity rating indicator associated with the predetermined portion of the digital media file indicates a recommended maturity rating for that predetermined portion. For example, a particular predetermined portion of the digital media file may have a maturity rating indicator corresponding to a maturity rating of "R". The maturity rating of "R" indicates that the particular predetermined portion of the digital media file is suitable only for a restricted audience. In one or more embodiments, each portion of the digital media file is of the same duration or size. In an alternative embodiment, each media rating entry of the media content rating table may further include a duration indicator indicating a length, such as a time or size, of the predetermined portion.

The digital media input 102 is further configured to receive an alternate media table corresponding to the digital media file and provide the alternate media table to the processor 104. The processor 104 is configured to store the alternate media table in the alternate media table storage device 112. In various embodiments, the alternate media table includes one or more alternate media blocks for replacing the media content of a predetermined portion of a digital media file with media content having a lower maturity rating than that of the predetermined portion. In various embodiments, each media rating entry of the media content rating table may further include an alternate media pointer pointing to an address within the alternate media table containing the alternate media block. In some embodiments, more than one of the media rating entries of the media content rating table may contain alternate media pointers pointing to the same alternate media block. For example, if a particular objectionable word occurs a multiple of times in the digital media file, the same alternate media block may be used to replace the objectionable word in each instance.

The user input interface 114 is configured to receive a selection of a maturity level from a user and provide the selected maturity level to the processor 104. The selected maturity level corresponds to a desired maturity level for content of the digital media file that should not be exceeded when the digital media file is presented to the user. For example, a user may select a maturity level of "G", indicating that the user does not wish to be presented with media content such as audio or video that is not approved for general audiences. In a particular embodiment, a user selects a selected maturity level, and the processor 104 modifies portions of the digital media file indicated by the entries within the media content rating table that exceed the selected maturity level. In at least one embodiment, the processor 104 modifies one or more portions of the digital media by replacing the portions of the digital media file with alternate media content found in the alternate media table. In other embodiments, the processor 104 may modify the digital media file by replacing portions of the digital media file having indicated maturity ratings greater than that of the selected maturity level with default media content. For example, for a portion of the digital media file including objectionable audio, the predetermined portion may be replaced with default media content containing a beep tone or silence. For a portion of the digital media file that include objectionable video content, the portion may be replaced with one or more blank video frames.

After modifying the digital media file, the processor 104 stores the modified digital media file within the media storage device 110. In at least one embodiment, a user at a later time may request that the inband variable media maturity filter device 100 play back the modified digital media file through the digital media output 116 so that the user may listen to and/or view the content of the modified digital media file using one or more media reproduction devices, such as a television or audio speakers, in communication with the digital media output 116. Although the embodiment illustrated in FIG. 1 shows the media content rating table storage device 108, the media storage device 110, and the alternate media table storage device 112 as separate devices, it should be understood that in other embodiments, one or more of the media content rating table storage device 108, the media storage device 110, and the alternate media table storage device 112 may be integrated into a single storage device.

Figure 2A:
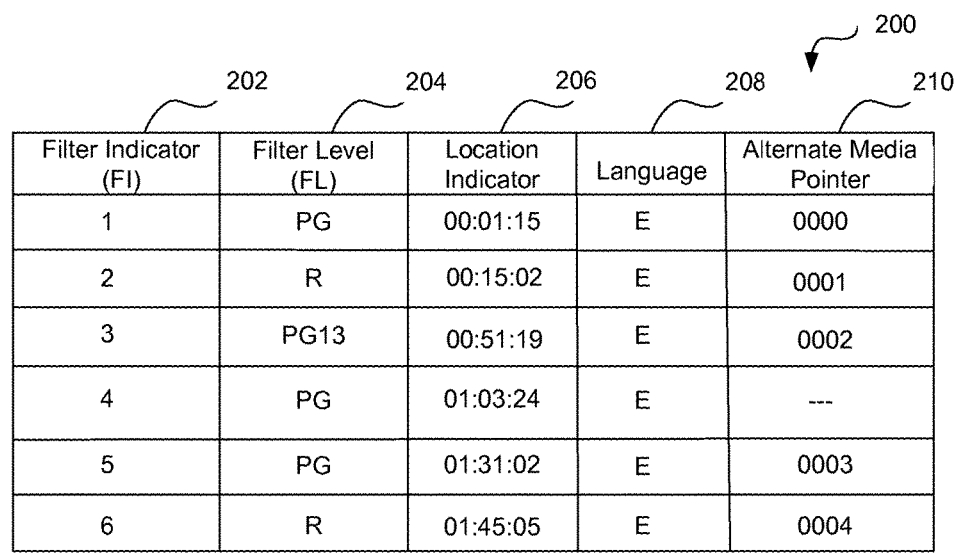
FIG. 2A is an embodiment of a media content rating table.

FIG. 2A is an embodiment of a media content rating table 200. The media content rating table 202 includes a filter indicator (FI) field 202. Each filter indicator field 202 identifies a media rating entry within the media content rating table 200 corresponding to a predetermined portion of a digital media file that may contain objectionable material. Each media rating entry further includes a filter level field 204 including a maturity rating of the predetermined portion of the digital media file, and a location indicator field 206 identifying a location within the digital media file of the predetermined portion. In a particular embodiment, the location indicator corresponds to an elapsed time measured from the beginning of the digital media file at which the predetermined portion occurs. In an alternative embodiment, the location indicator may correspond to a unique identifier associated each predetermined portion of the digital media file. Each media rating entry may further include a language field 208 indicating a language of the content associated with the predetermined portion of the digital media file. Each media rating entry of the media content rating table 200 further includes an alternate media pointer field 210. The alternate media pointer points to an address of alternate media content which may be used to replace the corresponding predetermined portion of the digital media file. In some embodiments, if the alternate media pointer field 210 corresponding to a particular media rating entry is blank or includes another reserved value, the blank field or reserved value serves as an indication that the predetermined portion of the digital media file may be replaced by default alternate media content such as a beep tone, silence, blank video or other default alternate media content.

In at least one embodiment, the alternative media content may include media content that has had some of its video and/or audio content removed. In some embodiments, the alternate media content may include alternative filmed footage that may be inserted in the place of objectionable media content. In one embodiment, the word "darn" may be inserted to replace the word "damn" in the digital media file. In still other embodiments, prior scenes or audio clips may be replayed to fill gaps due to removed media content. In various embodiments, potentially objectionable scenes in the digital media file may be cut, shortened, spliced, faded out, darkened, pixelized, blurred to remove objectionable material, etc. In another embodiment, nude scenes in the digital media file may be replaced with clothed scenes.

Figure 2B:
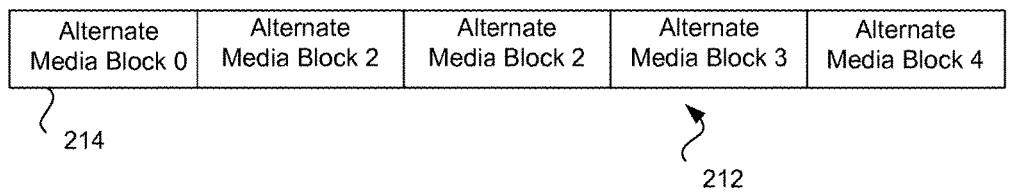
FIG. 2B is an embodiment of an alternate media table corresponding to the media content rating table of FIG. 2A.

FIG. 2B is an embodiment of an alternate media table 212 corresponding to the media content rating table 200 of FIG. 2A. The alternate media table 212 includes one or more alternate media blocks 214 corresponding to one or more alternate media pointers 210 within the media content rating table 200. For example, the media rating entry of media content rating table 200 having a filter indicator value of "1" has a filter level of "PG" and a location identifier of 00:01:15 identifying a location of a predetermined portion within the digital media file occurring at one minute and fifteen seconds since the beginning of the program contained in the digital media file. The media rating entry has a language field 208 value of "E" indicating that the particular portion of the digital media file is in English, and an alternate media pointer value of "0". The alternate media pointer value of "0" points to the address within the alternate media table 212 of alternate media block 0. The alternate media block 0 contains alternate media content that may be used to replace the content in the predetermined portion associated with the entry having a filter indicator value of "1". As further illustrated in FIGS. 2A and 2B, filter indicator "2" has a filter level of "R", a location indicator of 00:15:02, a language of "E" and an alternate media pointer of "1". Filter indicator "3" has a filter level of "PG13", a location indicator of 00:51:19, a language of "E", and an alternate media pointer of "2". Filter indicator "4" has a filter level of "PG", a location indicator of 01:03:24, a language of "E", and a blank alternate media pointer. The blank alternate media pointer indicates that the portion of the digital media file indicated by the media rating entry having a filter indicator value of "4" may be replaced by a default alternate media content if the selected maturity level is greater than "PG". Filter indicator "5" has a filter level of "PG", a location indicator of 01:31:02, a language of "E", and an alternate media pointer of "3". Filter indicator "6" includes a filter level of "R", a location indicator of 01:45:05, a language of "E", and an alternate media pointer value of "4". In a particular embodiment in which a user selects a maturity level of "PG", the inband variable media maturity filter device 100 replaces the predetermined portions of the digital media file corresponding to media rating entries having filter indicator values of "2", "3", and "6" within the media content rating table with the corresponding alternate media blocks 1, 2, and 4 within the alternate media table 212 to produce a modified digital media file.

Figure 3:
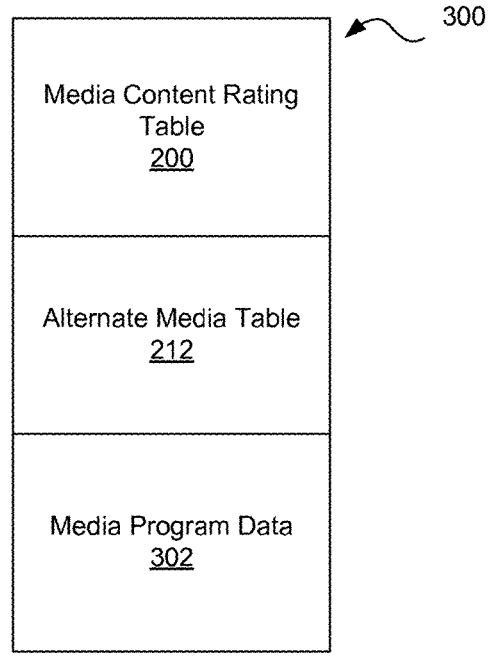
FIG. 3 is an embodiment of a digital media file structure of a digital media file.

FIG. 3 is an embodiment of a digital media file structure 300 of a digital media file. The digital media file structure 300 includes a media content rating table 200, an alternate media table 212, and media program data 302. The media program data 302 includes one or more of audio, program data, and video program data associated with a particular media program, such as a television program, a movie, or other digital media programs. In a particular embodiment, the media program data 302 includes one or more digital media blocks. In a particular embodiment, the media program data 302 is media program data encoded using an MPEG encoding standard, for example, an MPEG-4 encoding standard. The media content rating table 200 includes one or more media rating entries corresponding to one or more portions of the media program data 302. The alternate media table 212 includes one or more alternate media blocks referenced by the media content rating table 200 which may be used to replace portions of the media program data 302. Although the embodiment illustrated in FIG. 3 describes the media content rating table 200 and alternate media table 212 as being included with the media program data 302, in alternative embodiments one or more of the media content rating table 200 and the alternate media table 212 may be contained in separate files, and the media program data 302 may be included in a separate digital media file. In still other embodiments, the digital media file 300 may include a digital media stream and one or more of the media content rating table 200 and the alternate media table 212 may be included in separate media streams.

Figure 4:
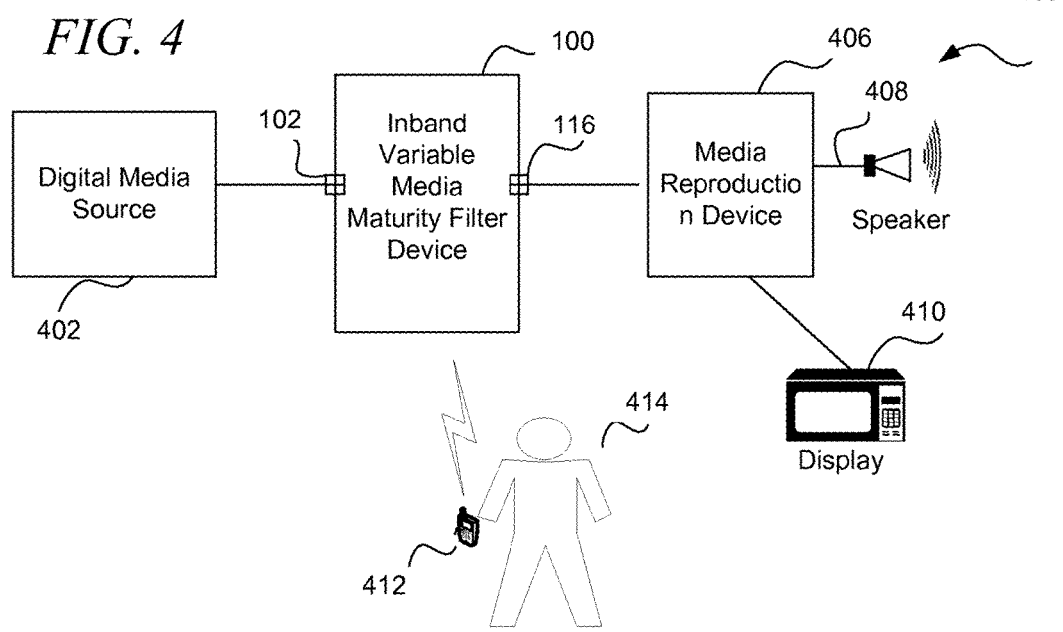
FIG. 4 is a an embodiment of a system for modifying a digital media file in accordance with one or more selected maturity levels.

FIG. 4 is a an embodiment of a system 400 for modifying a digital media file in accordance with one or more selected maturity levels. The system 400 includes a digital media source 402 in communication with the digital media input 102 of the inband variable media maturity filter device 100. In a particular embodiment, the digital media source 402 may include a digital television provider. In an alternative embodiment, the digital media source may include a media server. In still another embodiment, the digital media source may include a digital video disk player, such as a DVD player or a Blu Ray® player. The system 400 further includes a media reproduction device 406 in communication with the digital media output 116 of the inband variable media maturity filter device 100. The media reproduction device 406 includes an audio output coupled to a speaker 408 and a video output coupled to display 410. In at least one embodiment, the media reproduction device 406, speaker 408, and display 410 comprise a digital television. In an alternative embodiment, the media reproduction device 406 is a personal computer. The system 400 further includes a controller 412 configured to allow a user 414 to provide a selection of a desired maturity level to the inband variable media maturity filter device 100. In a particular embodiment, the controller 412 is a wireless handheld remote control. In one embodiment, the controller 412 may communicate with the user input interface 114 of the inband variable media maturity filter device 100 via an infrared transmission. In still other embodiments, the controller 412 may communicate with the user input interface 114 of the inband variable media maturity filter device 100 using a wireless radio frequency (RF) transmission or a wired connection.

In an example operation of the system 400 of FIG. 4, the inband variable media maturity filter device 100 receives a selection of a maturity level from a user using the controller 412 via user input interface 114. The digital media source 402 sends a media content rating table 200, an alternate media table 212, and a digital media file to the inband variable media maturity filter device 100 to the inband variable media maturity filter device 100. The inband variable media maturity filter device 100 receives the media content rating table 200, an alternate media table 212, a digital media file from the digital media source 402 and stores them in the media content rating table storage device 108, the alternate media table storage device 112, and the media storage device 110, respectively The inband variable media maturity filter device 100 then modifies one or more predetermined portions of the digital media file corresponding to at least one media rating entry in the media content rating table 200 in accordance with the selected maturity level to produce a modified digital media file. The inband variable media maturity filter device 100 stores the modified digital media file in media storage device 110. Upon receiving a request to play the modified digital media file from user 414 via controller 412, the inband variable media maturity filter device 100 plays the modified digital media file which includes streaming the digital media file to the media reproduction device 406 via the digital media output 116. The media reproduction device 406 then provides one or more of an audio output to the speaker 408 and a video output to the display 410. In accordance with various embodiments, the user 414 may listen to and/or view the content of the digital media file in a filtered form suitable for an audience indicated by the selected maturity level. In at least one embodiment, the user may select a second maturity level and the inband variable media maturity filter device 100 may modify the digital media file to create and store a second modified digital media file filtered according to the second maturity level rating for subsequent viewing by the user.

Figure 5:
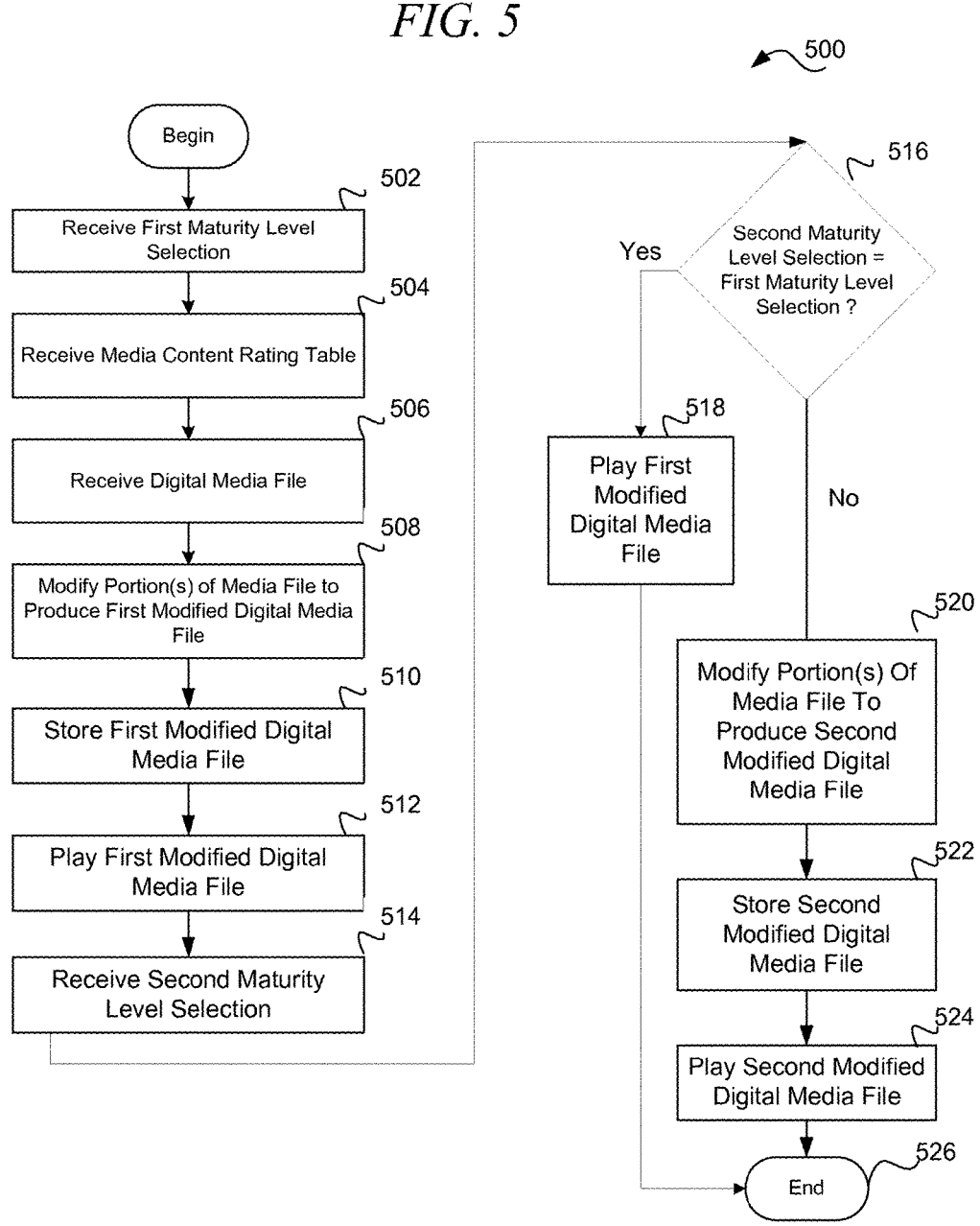
FIG. 5 is an embodiment of a procedure for modifying a digital media file in accordance with one or more selected maturity levels.

FIG. 5 is an embodiment of a procedure 500 for modifying a digital media file in accordance with one or more selected maturity levels. In step 502, the filter device 100 receives a selection of the first maturity level via the user input interface 114. The first maturity level selection indicates a desired maturity level for viewing digital media content by a user of the filter device 100. In step 504, the filter device 100 receives a media content rating table and stores the media content rating table within media content rating table storage device 108. The media content rating table includes at least one media rating entry. Each media rating entry includes a location indicator indicating a predetermined portion of the digital media file. Each media rating entry further includes a maturity rating indicator corresponding to a maturity rating of the predetermined portion. In a particular embodiment, the media content rating table is received in response to a user requesting a media program associated with a particular media file. In step 506, the filter device 100 receives the digital media file associated with a media content rating table and stores the digital media file in media storage device 110. In step 508, the inband variable media maturity filter device 100 modifies at least one predetermined portion of the digital media file if the indicated maturity rating of the at least one predetermined portion is greater than the selected first maturity level to produce a first modified digital media file.

In one embodiment, modifying the at least one predetermined portion of the digital media file, includes replacing the at least one predetermined portion of the digital media file with a digital encoded beep tone. In an alternative embodiment, modifying the at least one predetermined portion of the digital media file, includes replacing the at least one predetermined portion of the digital media file with digitally encoded silent audio. In still another embodiment, each media rating entry of the media content rating table 200 further includes an alternate audio pointer corresponding to the location of at least one alternate media block within an alternate media table 212. In such an embodiment, modifying the at least one predetermined portion of the digital media file may include replacing the at least one predetermined portion with the at least one alternate media block. In at least one embodiment, the alternate media table is received by the filter device 100 prior to step 508. In an alternative embodiment, the at least one alternate media block may be received in an alternate media stream. In step 510, the inband variable media maturity filter device 100 stores the first modified digital media file and an indication of the selected first maturity level in the media storage device 110. In step 512, the filter device 100 plays the first modified digital media file from the media storage device 111. In a particular embodiment, the filter device 100 plays the first modified digital media file in response to first receiving a first request for playing the first modified digital media file from a user. In an alternative embodiment, the inband variable media maturity filter device 100 plays the first modified digital media file automatically. In still another embodiment, the inband variable media maturity filter device 100 may play a portion of the first modified digital media file before modification of the digital media file is completed. Accordingly, a user may view and/or listen to the digital media file after having been filtered according to the user's first maturity level selection.

In step 514, the inband variable media maturity filter device 100 receives a selection of a second maturity level from a user via user input interface 114. In one or more embodiments, a user sends the second maturity level section to the inband variable media maturity filter device 100 if the user wishes to play the digital media file at a different maturity level than the first selected maturity level. In step 516, the inband variable media maturity filter device 100 determines if the second maturity level selection is equal to the first maturity level selection. If the second maturity level selection is equal to the first maturity level selection, the inband variable media maturity filter device 100 plays the first modified digital media file in step 518. If the second maturity level selection is not equal to the first maturity level selection, the inband variable media maturity filter device 100 modifies at least one predetermined portion of the digital media file. If the indicated maturity rating of the at least one predetermined portion is greater than the second selected maturity level, the inband variable media maturity filter device 100 modifies the at least one predetermined portion to produce a second modified digital media file. In step 520

In step 522, the inband variable media maturity filter device 100 stores the second modified digital media file in media storage device 110. The second modified digital media file represents a version of the digital media file filtered or modified according to the user's second selected maturity level. Accordingly, the user may choose between playing two versions of the digital media file, each filtered at a different maturity level, to be presented to a particular audience at a certain time. For example, parents may choose to have "PG13" audio and/or video when viewing a movie with their teenagers, but may choose the "R" rated version of the audio when watching the same movie at a later time alone. In step 524, the inband variable media maturity filter device 100 plays the second modified digital media file. In step 526, the procedure 500 ends.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device. In various embodiments, the inband variable media maturity filter device 100 includes one or more processors operable to execute computer executable instructions from a computer-usable or computer-readable medium to perform the various capabilities of the inband variable media maturity filter device 100 described herein.

The computer-usable or computer-readable medium can be an electronic, magnetic, optical, electromagnetic, infrared, or semiconductor system (or apparatus or device) or a propagation medium. Examples of a computer-readable medium includes a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for filtering a digital media file utilizing a set-top box, comprising:
   receiving a selection of a first maturity level from a user;
   receiving a media content rating table including at least one media rating entry, each media rating entry in the media content rating table including (1) a location indicator indicating a predetermined portion of an entire digital media file, wherein the location indicator is a time indicator corresponding to elapsed time of a portion of the entire digital media file, and (2) a maturity rating indicator corresponding to a maturity rating of the predetermined portion;
   receiving the entire digital media file for storage;
   automatically modifying at least one predetermined portion of the entire digital media file utilizing the associated location identifier in the media content rating table if the indicated maturity rating of the at least one predetermined portion is greater than the selected first maturity level to produce a first modified digital media file that is filtered utilizing the set-top box, wherein, based on a determination that the at least one predetermined portion contains one or more nude scenes, the at least one predetermined portion is automatically modified by replacing a first media stream containing an entire content of the one or more nude scenes in the at least one predetermined portion of the entire digital media file with a second media stream containing an entire content of one or more clothed scenes, wherein the first modified digital media file comprises the media content of the entire digital media file in which the at least one predetermined portion of the entire digital media file comprises the second media stream containing the entire content of the one or more clothed scenes instead of the first media stream containing the entire content of the one or more nude scenes, wherein each media rating entry further includes an alternate media table having at least one alternate media block corresponding to the at least one predetermined portion, wherein the alternate media block comprises an alternate audio content, and wherein modifying the at least one predetermined portion of the entire digital media file utilizing the associated location identifier in the alternate media table further includes replacing two or more portions of the at least one predetermined portion of the entire digital media file with the same alternate media block that is pointed to by two or more alternate media pointers in the alternate media table; and
   storing the first modified digital media file for subsequent playback in response to a request from the user;
   receiving the request from the user for playing the first modified digital media file; and
   playing the first modified digital media file in response to receiving the request, wherein the first modified digital media file is not played in real-time.

2. The method of claim 1, wherein modifying the at least one predetermined portion of the entire digital media file utilizing the associated location identifier further includes replacing the at least one predetermined portion of the entire digital media file with a digitally-encoded beep tone.

3. The method of claim 1, wherein modifying the at least one predetermined portion of the entire digital media file utilizing the associated location identifier further includes replacing the at least one predetermined portion of the entire digital media file with digitally-encoded silent audio.

4. The method of claim 1, further comprising:
   receiving the alternate media table, the alternate media table including the at least one alternative media block.

5. The method of claim 1, further comprising:
   receiving at least one alternate media block in an alternate media stream.

6. The method of claim 1 further comprising:
   storing the first modified digital media file, the associated location identifier, and an indication of the selected first maturity level in a media storage device.

7. The method of claim 1 further comprising:
   receiving a selection of a second maturity level; and modifying at least one predetermined portion of the entire digital media file utilizing the associated location identifier in the media content rating table if the indicated maturity rating of the at least one predetermined portion is greater than the selected second maturity level to produce a second modified digital media file.

8. The method of claim 1, further comprising:
receiving a selection of a second maturity level; and
playing the first modified media file if the selected second maturity level is equal to the selected first maturity level.

9. The method of claim 1, wherein the entire digital media file comprises a digital media stream.

10. A media maturity filter device, comprising:
a memory; and
at least one processor, the at least one processor configured to retrieve computer-readable instructions from the memory and execute the computer-readable instructions so as to:
receive a selection of a first maturity level from a user;
receive a media content rating table including at least one media rating entry, each media rating entry in the media content rating table including (1) a location indicator indicating a predetermined portion of an entire digital media file, wherein the location indicator is a time indicator corresponding to elapsed time of a portion of the entire digital media file, and (2) a maturity rating indicator corresponding to a maturity rating of the predetermined portion;
receive the entire digital media file for storage;
automatically modify at least one predetermined portion of the entire digital media file utilizing the associated location identifier if the indicated maturity rating of the at least one predetermined portion is greater than the selected first maturity level to produce a first modified digital media file that is filtered, wherein, based on a determination that the at least one predetermined portion contains one or more nude scenes, the at least one predetermined portion is automatically modified by replacing a first media stream containing an entire content of the one or more nude scenes in the at least one predetermined portion of the entire digital media file with a second media stream containing an entire content of one or more clothed scenes, wherein the first modified digital media file comprises the media content of the entire digital media file in which the at least one predetermined portion of the entire digital media file comprises the second media stream containing the entire content of the one or more clothed scenes instead of the first media stream containing the entire content of the one or more nude scenes, wherein each media rating entry further includes an alternate media table having at least one alternate media block corresponding to the at least one predetermined portion, wherein the alternate media block comprises an alternate audio content, and wherein modifying the at least one predetermined portion of the entire digital media file utilizing the associated location identifier in the alternate media table further includes replacing two or more portions of the at least one predetermined portion of the entire digital media file with the same alternate media block that is pointed to by two or more alternate media pointers in the alternate media table; and
store the first modified digital media file for subsequent playback in response to a request from the user user;
receiving the request from the user for playing the first modified digital media file; and
playing the first modified digital media file in response to receiving the request, wherein the first modified digital media file is not played in real-time.

11. The media maturity filter device of claim 10, wherein the at least one processor is further configured to:
receive a selection of a second maturity level; and
modify at least one predetermined portion of the entire digital media file utilizing the associated location identifier in the media content rating table if the indicated maturity rating of the at least one predetermined portion is greater than the selected second maturity level to produce a second modified digital media file.

12. The media maturity filter device of claim 10, wherein the at least one processor is further configured to:
receive a selection of a second maturity level; and
play the first modified media file if the selected second maturity level is equal to the selected first maturity level.

13. A computer usable program product, in a non-transitory computer-readable medium storing computer executable instructions that, when executed, cause at least one processor to:
receive a selection of a first maturity level from a user;
receive a media content rating table including at least one media rating entry, each media rating entry of the media content rating table including (1) a location indicator indicating a predetermined portion of an entire digital media file, wherein the location indicator is a time indicator corresponding to elapsed time of a portion of the entire digital media file, and (2) a maturity rating indicator corresponding to a maturity rating of the predetermined portion;
receive the entire digital media file for storage;
automatically modify at least one predetermined portion of the entire digital media file utilizing the associated location identifier if the indicated maturity rating of the at least one predetermined portion is greater than the selected first maturity level to produce a first modified digital media file that is filtered, wherein, based on a determination that the at least one predetermined portion contains one or more nude scenes, the at least one predetermined portion is automatically modified by replacing a first media stream containing an entire content of the one or more nude scenes in the at least one predetermined portion of the entire digital media file with a second media stream containing an entire content of one or more clothed scenes, wherein the first modified digital media file comprises the media content of the entire digital media file in which the at least one predetermined portion of the entire digital media file comprises the second media stream containing the entire content of the one or more clothed scenes instead of the first media stream containing the entire content of the one or more nude scenes, wherein each media rating entry further includes an alternate media table having at least one alternate media block corresponding to the at least one predetermined portion, wherein the alternate media block comprises an alternate audio content, and wherein modifying the at least one predetermined portion of the entire digital media file utilizing the associated location identifier in the alternate media table further includes replacing two or more portions of the at least one predetermined portion of the entire digital media file with the same alternate media block that is pointed to by two or more alternate media pointers in the alternate media table; and store the first modified digital media file for subsequent playback in response to a request from the user user;

receiving the request from the user for playing the first modified digital media file; and playing the first modified digital media file in response to receiving the request, wherein the first modified digital media file is not played in real-time.

14. The computer usable program product of claim 13, further including computer-readable medium storing computer executable instructions that, when executed, cause at least one processor to:

receive a selection of a second maturity level; and modify at least one predetermined portion of the entire digital media file utilizing the associated location identifier if the indicated maturity rating of the at least one predetermined portion is greater than the selected second maturity level to produce a second modified digital media file.

* * * * *